Dec. 29, 1964  R. B. McLAUGHLIN  3,163,276
VENDING MACHINES
Filed Jan. 29, 1962  5 Sheets-Sheet 1

FIG_1

FIG_2

FIG_2A

FIG_3

INVENTOR.
ROBERT B. McLAUGHLIN
BY
ATTORNEY

Dec. 29, 1964  R. B. McLAUGHLIN  3,163,276
VENDING MACHINES
Filed Jan. 29, 1962  5 Sheets-Sheet 2

FIG_4

FIG_5

FIG_5A

FIG_6

INVENTOR.
ROBERT B. McLAUGHLIN
BY
ATTORNEY

Dec. 29, 1964   R. B. McLAUGHLIN   3,163,276
VENDING MACHINES
Filed Jan. 29, 1962   5 Sheets-Sheet 3

INVENTOR.
ROBERT B. McLAUGHLIN
BY
ATTORNEY

Dec. 29, 1964  R. B. McLAUGHLIN  3,163,276
VENDING MACHINES

Filed Jan. 29, 1962  5 Sheets-Sheet 4

INVENTOR.
ROBERT B. McLAUGHLIN
BY
ATTORNEY

United States Patent Office 3,163,276
Patented Dec. 29, 1964

3,163,276
VENDING MACHINES
Robert B. McLaughlin, 501 Greer Road, Palo Alto, Calif.
Filed Jan. 29, 1962, Ser. No. 169,364
15 Claims. (Cl. 194—7)

This invention relates to vending machines generally and particularly to banks of vending machines intended to facilitate speeding up and simplification of the heretofore employed time-consuming marketing procedure, and to the method whereby items of merchandise can be readily selected and as readily picked up by a customer and carried from the premises without delay due to rechecking the merchandise at some other point.

One of the objects of the present invention is the method of retaining items of merchandise for instant delivery upon the presentation to a vending machine of a required pay element.

Another object of this invention is the method of readying in a vending machine items of merchandise for instant delivery when selected by a customer using a proper pay element, by retaining such items by means of heat-sensitive elements and causing the release of the items for delivery by subjecting said heat-sensitive elements to heat.

Another object of this invention is the provision of a vending machine having a very simple, inexpensive and very effective item retaining and item releasing structure adapted for handling merchandise of any kind, type, shape, and weight, irrespective of its bulk, and which machine can be readily stocked and serviced by even nonskilled labor and requires a minimum effort in maintaining it in faultless operation and repair.

Another object of this invention is the provision of a very simple and inexpensive vending machine structure, wherein any type of merchandise items can be maintained in readiness for delivery by item retaining elements, which when either weakened or severed release the items for delivery, upon presentation of a required pay element.

A more specific object of the present invention is the provision in a vending machine for any sort of merchandise items of heat-sensitive item-retaining elements for keeping merchandise items in readiness for delivery, and which retaining elements, when subjected to the influence of heat will weaken and either deform or separate to release items for delivery, in return for a proper pay element inserted into the machine.

Another important object of this invention is the provision of merchandise vending machines employing what may be termed "the first-in first-out" principle applying to merchandise items to avoid delivery of stale merchandise, said provision including means for loading items from any convenient point, even at the point where items are dispensed, so that all items of an original stock are sold first before re-stocking of the machine. To explain: a lazy loader of items will refill the easy way, such as filling the empty spaces of a vending machine with new merchandise instead of moving the old remnants to the dispensing point and placing the new items at the end of the old items still left in the machine.

Another object of this invention is the provision of a vending machine structure wherein merchandise items to be bought are held ready for delivery by suspending the merchandise items by heat influenced means in the form of ribbons, cords, threads, strips or any other suitable retention elements, and wherein means are provided to sever such item retention means for instance, by cutting or shearing them, when the correct pay element has been presented into the machine, thus releasing the merchandise items for delivery.

A further object of the present invention is the provision in the instant vending machine of a normally open electric circuit controlled and momentarily closable by a suitable pay element presented into the machine, and which circuit comprises a source of electric energy and a plurality of series-connected, individual item-retaining devices, adapted to successively release for delivery item after item in return for each successively presented pay element, and wherein each of the item-retaining devices constitutes an arrangement of switch means comprising two spaced outer contact members and an inner double contact member located between them, the contacts of the latter double contact member being adapted for engagement with either of the two outer contact members, but normally being in engagement with one of them, the employment of an electric heating element in series with the other outer contact member, both outer contact members being mobile and having means for supporting a heat-sensitive merchandise retaining element, the latter element being disposed in near proximity to said heating element, said heating element being adapted, when energized, to either weaken or break said retaining elements, the closing of the circuit for energizing said heating element being effected by the insertion into the machine of a pay element, the weakening or breaking of the retaining element releasing merchandise items for delivery from the machine.

Still a further object of this disclosure is the provision of a vending machine structure, including an electric circuit, and wherein is arranged a plurality of merchandise supporting means electrically connected in series with each other, and wherein a single receiver for pay elements controls the release, one at a time, of a merchandise item, each time a pay element is inserted into the machine.

Still another object of this invention is the provision of a merchandise retaining and releasing structure for each merchandise item, and which structure comprises a pair of spaced fixed contact members, each having a single contact, and a mobile double contact member operative between them and normally engaging with one of its double contacts one of the fixed contacts, said mobile contact member having means for removably attaching thereto a heat-responsive merchandise retaining element for keeping a merchandise item in readiness for delivery, said mobile contact member then engaging with its other contact the other fixed contact, due to the force exerted by the weighted-down retaining element upon said mobile contact member, an electrically heatable resistance element in series with said other fixed contact member, said retaining element being located in near proximity to said resistance element while suspended from said mobile contact member, a receiver for pay elements, a pair of spaced conductors in said receiver, a pay element adapted, when inserted into the receiver, to cause said conductors to be connected, an electric circuit including said fixed and mobile contact members, also said resistance element and said conductors in the receiver, said resistance element becoming energized when a pay element is placed into said receiver, the heated resistance element weakening to a separating point said retaining element, the latter then releasing the merchandise for delivery.

Another object of this invention is the provision of a vending machine for the successive delivery, one by one, of merchandise items upon successive presentation into the machine of pay elements for each item, and wherein said items are suspended at an incline and wherein a single delivery chute is employed for the successive discharge of said items.

Another object of this invention is the provision in a vending machine of thermally releasable, thermally frangible or otherwise heat-sensitive retaining elements for keeping merchandise items in storage and in readiness for delivery, and wherein an electric heating element is employed in near proximity to said retaining elements, said latter elements not requiring to be actually severed by the application of heat, it being sufficient to cause said elements to merely stretch enough or deform to release a merchandise item, and, upon release of an item, causing the de-energizing of the heating element.

A further object of this invention is the provision in a vending machine of merchandise retaining means of various structures or types including heat-sensitive, non-resilient, elements employed in combination with the weight of merchandise items; or resilient elements for holding such items under stress, such as a rubber band; or heat-deformable compression elements becoming soft and yielding under the influence of heat; and wherein heating means for such retaining elements are provided in the form of electrical resistances, and wherein other means are provided for stopping the supply of electric current to said resistances upon the release of merchandise by said retaining means.

Another object of the present invention is the provision in a vending machine of merchandise item retaining elements in the shape of heat-sensitive strips, ribbons or bight-provided bands, which when caused to release an item remain either fully or partly connected with the released item, to avoid clogging of the machine by used retaining elements.

A further object of this invention is the provision in a vending machine of merchandise item supporting means, wherein the delivery of items is effected by gravity, said supporting means being held in readiness for delivery of items by heat-responsive restraining elements which are either of a non-resilient type, preferably combined with the weight of an item, or a spring force, or resilient restraining means held under stress.

An additional object of this invention is the provision in a vending machine of heat-responsive retaining means for items of merchandising and electrically controlled heating means, and wherein said retaining means are located in close proximity to said heating means, which latter, when energized, cause said retaining means to release merchandise items for delivery from the machine, and wherein means are provided to de-energize said heating means upon delivery of each item.

Still another object of the present invention is the provision in a store of an arrangement in banks of a number of machines of the type indicated, and wherein each machine is rendered individually accessible, both for stocking it with merchandise and for direct delivery of merchandise articles to the purchaser upon presentation of a required pay element, and wherein a change booth is provided for the purchase of suitable pay elements.

An additional object of this invention is the provision in a vending machine of an endless mobile suspension device for a plurality of merchandise items to be dispensed, said device being adapted to transport items suspended from a heat-sensitive element to a position at which means are actuated to cause said device to momentarily stop, and wherein other means are provided to cause the release of the suspended item at the moment the device is at a standstill.

The foregoing and still other objects and additional advantages of the present invention will become more fully apparent and understood from the following description, reference being had to the accompanying drawings, which latter are held in a more or less diagrammatical form and are intended for explanatory purposes only, without in any way restricting the instant disclosure to the illustrations presented, and it is to be understood that in the course of production and employment of the present device, changes in structure and location of different parts may have to be resorted to for the purpose of economical manufacture and to meet various requirements, and in which drawings:

In all of the FIGURES 1 to 9 there will be seen a receiver 10 for pay elements, such as a coin, a token, a bill, a charger plate, a coded card, a key or the like, each intended upon presentation or insertion into the receiver 10 to close an electric circuit hereinafter described. By way of illustration only there is shown simply a slot 11 in receiver 10 for insertion thereinto of pay elements. By depressing button 12 an inserted pay element can be returned, when appropriate. (See FIGS. 1, 2 and 3.)

Two conductors 13 and 14 pass into receiver 10 and upon presentation or insertion of a pay element are caused to be momentarily connected together by any suitable means, many of which are well known in the art. The connecting together of conductors 13 and 14 closes an electric circuit explained in detail hereinafter.

It is to be noted that neither the receiver nor its structure, except broadly as a pay-element-actuated means for closing a circuit, forms a part of this invention, since such coin or token receivers or the like are well-known in the art.

Figure 1:
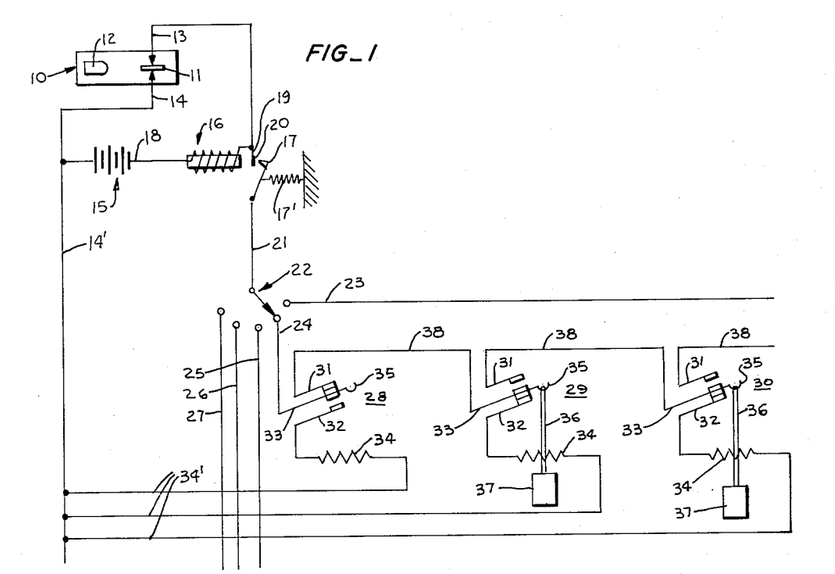
FIG. 1 illustrates a diagrammatical arrangement of a plurality of merchandise-holding units in an electric circuit, as one of the preferred embodiments of the present invention.

The diagram seen in FIG. 1 illustrates receiver 10 in a part of a normally open electric circuit. There is seen a source of electric energy in the form of a battery 15, a holding relay or solenoid 16, seen in detail in FIG. 3, with its conductive armature 17.

Conductor 13 leads to one end of the winding of solenoid 16, the other end of the winding being connected with battery 15 by conductor 18. Conductor 14 extends directly to battery 15. From conductor 13 branches off a conductor 19, terminating in contact element 20. The contact 20 is adapted for engagement by armature 17 when the latter becomes attracted by solenoid 16, thereby retaining the solenoid energized after the momentary connection between conductors 13 and 14, caused by presentation of a pay element at slot 11, ceases.

Armature 17 is biased by spring 17' or any other suitable means to normally retain it at a distance from solenoid 16. However, the momentary closing of the circuit caused by presentation of a pay element to receiver 10 suffices to attract armature 17 for causing the latter to engage contact element 20.

Analysing the diagram in FIG. 1, it becomes evident that the diagram actually represents two circuit parts, one circuit part including the receiver 10, conductors 13 and 14, battery 15 and solenoid 16, whereas the other circuit part consists of the continuation 14' of conductor 14, battery 15, conductor 18, branch conductor 19, contact element 20, conductive armature 17, lead 21 from the armature, selective switch 22 and any of the leads 23, 24, 25, 26 and 27 extending to a plurality of series-connected merchandise-retaining and releasing switch units 28, 29 and 30, all forming elements of the other circuit part.

Only three of such switch units are shown, as illustrative representation of any desired number of units capable of placement into a vending machine structure.

Figures 2, 2A, 3:
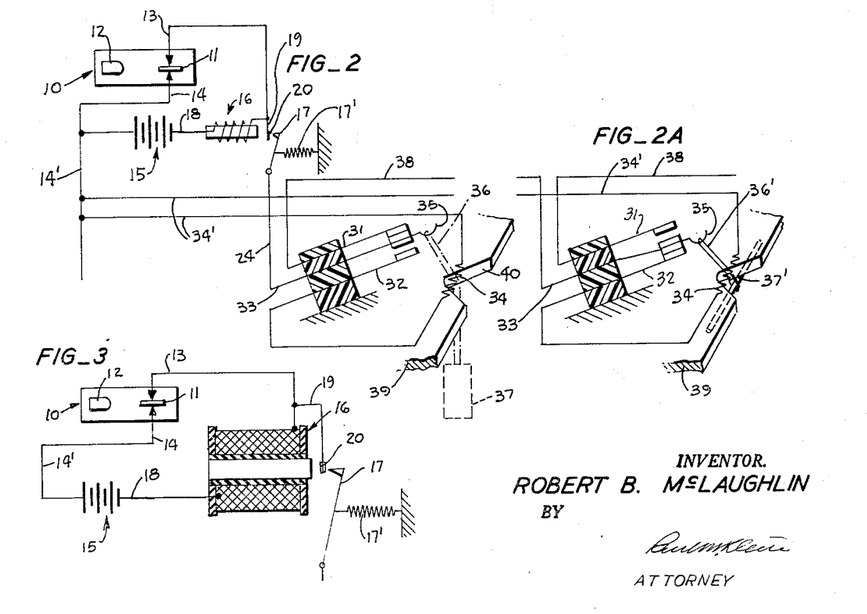
FIG. 2 shows a portion of an electric circuit similar to that seen in FIG. 1, but disclosing only one of the unit structures upon a fixed support, the unit being shown in readiness for suspending therefrom by means of a severable element, a weighty item of merchandise indicated in broken lines.
FIG. 2A illustrates a continuation portion of FIG. 2, wherein a lightweight merchandise item is held by a resilient heat-separable retaining element under tension against the lower face of the support, said merchandise item being released for delivery by the presentation of a pay element.
FIG. 3 is a diagrammatical detail view of a holding relay employed and a part of an electric circuit, said rely being seen in its open condition, the circuit including a receiver for a pay element, a source of electric energy, and a conductive armature for the relay.

Preferred embodiments of several switch units are seen in FIGURES 1, 2 and 2A at an inclined position and comprise a pair of spaced outer fixed upper and lower contact members 31 and 32 and an inner mobile double contact member 33 operative between the outer contact members and biased to normally engage upper fixed contact member 31. An electric heating element 34 is connected in series with lower fixed contact member 32 and a lead 34' extending from element 34 to conductor 14' effects connection with battery 15. (See FIG. 1.)

Mobile contact members 33 terminate in suspension hooks 35 for receiving retaining or suspension elements 36 for merchandise items 37, which latter, due to their weight, cause mobile member 33 to engage lower fixed contact member 32 (see FIG. 1, units 29 and 30), thereby affecting electric connection between heating element 34 and battery 15.

Item-retaining element 36 is heat-sensitive and is located either in close proximity to or in contact with heating element 34. Upon application of current to the heating element, the retaining element 36 will either separate as a direct result of the heat or will weaken sufficiently to separate under the load provided by merchandise item 37 or the like, thereby releasing a merchandise item for delivery. It is to be noted that fixed upper contact members 31 are connected by leads 38 with mobile contact members 33 (see FIG. 1, units 28, 29 and 30).

*Operation of the Embodiment Seen in FIGURES 1 and 2*

Assuming that no merchandise item is suspended from hook 35 of unit 28 (having been either omitted during the loading of the machine or having already been sold), the configuration of the machine parts will be as shown schematically in FIG. 1 with the central mobile double contact member 33 of unit 28 biased into engagement with its respective contact 31, while the remaining loaded units such as 29 and 30 have their respective central contact members 33 held by their respective merchandise loads 37 in engagement with their respective lower contact members 32. When a pay element is presented in slot 11 of receiver 10, the upper circuit part becomes momentarily energized as the pay element causes conductors 13 and 14 to be connected together. Thus solenoid 16 is caused to attract armature 17 which in turn engages contact 20, thus keeping the solenoid or relay 16 energized. Current then passes from one terminal of battery 15 by lead 18, through solenoid 16, through lead 19, contact 20, armature 17, conductor 21, switch 22, conductor 24, mobile contact member 33 of unit 28, upper fixed contact member 31 of unit 28, lead 38, mobile contact member 33 of unit 29, fixed lower contact member 32 of unit 29, to resistance element 34 of unit 29; from there leads 34' and 14' connect the heating element with the other terminal of battery 15.

Since the item-retaining or item-suspension element 36 is heat-sensitive and it either passes over or is located at a very short distance from heating element 34 of unit 29, the suspension element either separates directly from the heat or weakens sufficiently from the heat to separate under the load of item 37, thus releasing the suspended merchandise item for delivery. The mobile contact member 33 of unit 29 is thus released to assume its normal unloaded position of engaging its respective upper fixed contact member 31, in the manner seen at unit 28.

During the movement of mobile contact member 33 of unit 29 from the position in engagement with fixed contact member 32 to a position in engagement with the fixed upper contact member 31, the flow of current through the lower circuit part is interrupted just as the mobile contact member 33 disengages from fixed contact member 32, whereby holding relay 16 becomes de-energized and releases armature 17. This readies the machine for the next merchandise delivery operation which will involve delivery of merchandise from the next contact unit, unit 30, when a pay element is next presented to the receiver 10. In this next operation the path for the current to unit 30 is from battery 15 through lead 18, solenoid 16, lead 19, contact 20, armature 17, lead 21, switch 22, lead 24, closed contacts 33 and 31 of unit 28, lead 38 from unit 28 to unit 29, closed contacts 33 and 31 of unit 29, lead 38 from unit 29 to unit 30, closed contacts 33 and 32 of unit 30, resistance element 34 of unit 30, and thence through leads 34' and 14' back to battery 15.

It will be apparent from the foregoing description that the machine automatically sets itself to deliver merchandise items in sequence from left to right as viewed in FIG. 1 and that the absence of an item on any unit or units will not disturb this sequential delivery. The release circuit is automatically passed along from the left to the first loaded unit toward the right. Thus, if units 28, 29 and 30 are all loaded, delivery will occur sequentially in that order. If, at the start, unit 28 is empty and units 29 and 30 are loaded, the first delivery will be made from unit 29. If at the start, units 28 and 30 are loaded but unit 29 is empty, then the first delivery will be made from unit 28 and the second delivery will be made from unit 30, the pass-along circuit acting during the second delivery operation to automatically by-pass the resistance elements of units 28 and 29 and carry the current through the closed contact pairs 33, 31 of these units directly to the resistance element 34 of unit 30.

In FIGURES 1 and 2 the item retaining elements 36 can be either resilient or non-resilient, but must be heat-responsive. They are normally held under tension by the weight of merchandise items 37 and are directed to pass over resistances 34. FIG. 2 diagrammatically illustrates the contact members 31, 32 and 33 being held in fixed inclined position upon platform 39, the latter having a recess 40 for facilitating the guiding of the retaining element 36 into place, that is into contact with resistance 34.

In FIGURE 2A there is shown a contact unit similar to those of FIGS. 1 and 2, wherein, however, a light-weight article of merchandise 37' is tensionally held against the under surface of platform 39 by a resilient item-retaining element 36′, such as a rubber band, engaging hook 35 of the mobile contact member 33, while retaining element 36′ passes over resistance 34. When element 36′ is subjected to heat by resistance 34, item 37′ to released for delivery.

Merchandise retaining element 36′ (FIG. 2A) can either be severed completely at the point of contact with heating element 34 so that its upper end is retained above platform 39, while its lower end is permitted to fall down by itself into a delivery chute, or the lower portion of the retaining element can be permanently secured to the merchandise item 37′, so that both the latter and the retaining element are delivered together, thereby minimizing the possibility of clogging the machine with loose portions of retaining elements.

It is to be observed that all of the merchandise retaining elements are indicated as simple slim cords looped about hooks 35, yet these retaining or suspension elements can be in the form of bands, for instance bands provided with apertures for placing the bands over the hooks, or the suspension elements can be constructed of a single cord with a loop or bight formed at one end, the loop being so shaped that one of its parts is placed in position to be severed, while the cord portion extending from the loop is fixedly secured to the merchandise.

The above suggested modifications of merchandise retaining elements are readily understood from their description and therefore require no illustration.

Figure 4:
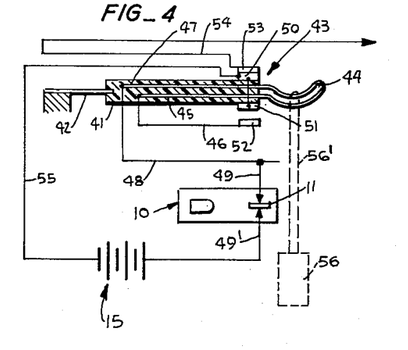
FIG. 4 is a diagrammatical detail illustration of a mobile suspension hook for merchandise, in the form of a heating element.
Figure 5:
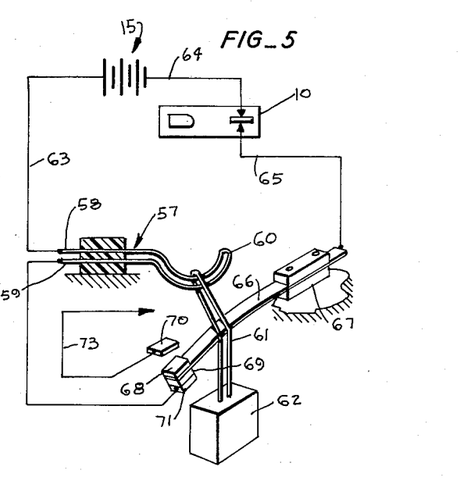
FIG. 5 discloses a fixed suspension hook made of resistance wire.
Figure 5A:
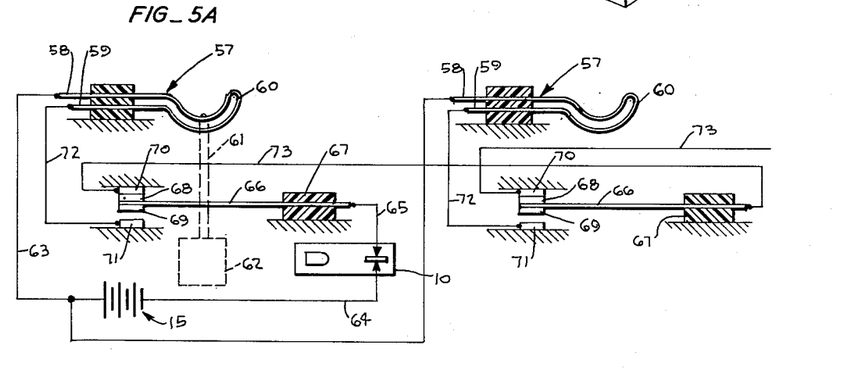
FIG. 5A illustrates two series-connected suspension hooks similar to that shown in FIG. 5.

Modified arrangements of merchandise retaining and releasing devices are illustrated in FIGURES 4, 5 and 5A, wherein the heatable resistance elements take the shape of suspension hooks, but wherein the holding relays 16 and the lower parts of the electric circuit (seen in FIG. 1) are omitted for simplicity reasons. In FIGURE 4 the contact structure comprises an insulating body 41 resiliently supported at 42. Imbedded in the insulating body and projecting therefrom is a resistance element 43 terminating in a hook formation 44. One interior end portion 45 of the element is connected with fixed outer contact member 46, while the other interior end portion 47 of element 43 is connected by lead 48 with one of the spaced conductors 49, 49′ located in receiver 10.

Exteriorly to insulating body 41 and in near vicinity to hook 44 are provided interconnected lower and upper contacts 50 and 51, contact 51 being in alignment with contact point 52 of fixed lower contact member 46. Opposite contact 50 engages contact 53 of fixed contact member 54, which latter two elements form part of the pass-along circuit generally analogous to element 31 and 38 in FIG. 1.

Contacts 50 and 51 are secured to insulating body 41 and are connected with each other, and a lead 55 connects them with battery 15. The insulating body 41 with its contacts 50 and 51 constitutes a mobile contact member, similar to mobile contact member 33 seen in FIGURES 1 and 2, and similarly also upper contact point 50 of mobile body 41 is adapted to normally engage contact 53 of the upper fixed contact member 54, in that resilient support 42 for body 41 biases the latter in an upward direction.

*Operation of the Embodiment Seen in FIGURE 4*

When an item of merchandise 56 is suspended from hook 44 by retaining element 56′ (both the merchandise and said retaining element being indicated in broken lines), contact 51 is caused to engage fixed contact 52, while contact 50 disengages from upper fixed contact 53. When now a pay element is inserted into slot 11 of receiver 10, conductors 49 and 49′ are connected, conductor 49′ extending to battery 15, thus causing current to flow through resistance element 43, thereby heating it. The heated element severs item retaining element 56′ and releases item 56 for delivery.

Another modified structure of the present invention is shown in FIGS. 5 and 5A, wherein FIG. 5A serves for better understanding of FIG. 5, and illustrates the normal state of but two series-connected contact units. In both FIGURES 5 and 5A are seen fixedly supported resistance elements 57 comprising spaced upper and lower legs 58 and 59, respectively, fixedly lodged in insulating material and forming an exterior hook 60 adapted for engagement by retaining element 61 for an item of merchandise 62. Upper resistance leg 58 is connected by lead 63 to one terminal of battery 15 while conductor 64, projecting into receiver 10, leads to the other battery terminal. Another conductor 65 also projects into receiver 10 and connects with resilient mobile double contact blade 66, extending from a fixed insulating support 67. Blade 66 is provided with upper and lower contact points 68 and 69, respectively.

Opposite contact points 68 and 69 of mobile, flexible blade 66 are disposed spaced, fixed contact points 70 and 71, respectively. Lower fixed contact point 71 is connected by lead 72 to lower leg 59 of resistance element 57, and upper fixed contact point 70 is connected (see FIG. 5A) by conductor 73 to the next adjacent contact unit.

As seen in FIG. 5A, blade 66 is biased upwardly so that its upper contact point 68 normally engages upper fixed contact point 70. Element 61 retaining in suspension merchandise item 62 so engages resilient blade 66, as to cause upper blade contact 68 to disengage upper fixed contact 70, while causing the lower blade contact 69 to engage lower fixed contact 71 (see FIG. 5). This latter contact engagement energizes resistance element 57, provided a pay element is placed into receiver 10. The heated resistance element severs item retaining element 61, thus releasing item 62 for delivery.

Figure 6:
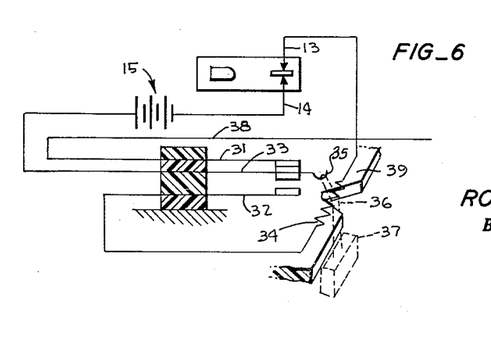
FIG. 6 illustrates a detail arrangement of a suspension unit similar to that seen in FIGS. 1, 2 and 2A, but with the suspension hook in horizontal position.

Referring now to FIG. 6, it will be noted that this illustrated embodiment is very similar to that seen in FIGURES 1, 2 and 2A, except that the contact structure is in horizontal position as compared with the inclined position of the contact units shown in these three above-stated figures; however, all components in FIGURE 6 are identified by like numerals seen in FIGURES 1 and 2.

As stated above, holding relays or solenoids 16 as well as the lower part of the electric circuit seen in FIGURE 1 are omitted in FIGURES 4 to 6 for the sake of simplicity and the reason of saving space; obviously such relays are intended to be considered as included in these illustrations.

Figures 7, 8, 9:
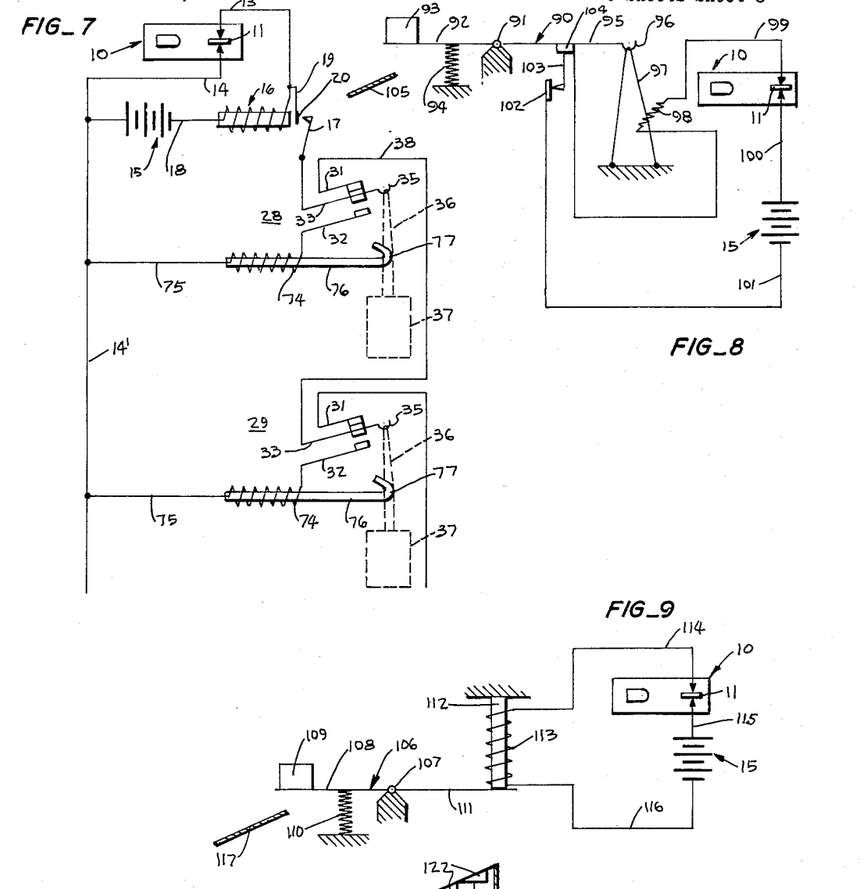
FIG. 7 shows an electric diagram including electromagnetically operated cutting means for releasing suspended merchandise items for delivery.
FIG. 8 illustrates a modified gravity-employing arrangement for releasing merchandise items from a vending machine.
FIG. 9 presents another embodiment of merchandise suspension and releasing means similar to that seen in FIG. 8.

In FIGURE 7 is presented another modified merchandise releasing arrangement. There will be found again a receiver 10 for pay elements, with a slot 11 for inserting the latter, spaced conductors 13 and 14 extending into the receiver and adapted to be connected upon presentation of a pay element, not illustrated. There is also shown a battery 15, a holding relay or solenoid 16 with a conductive mobile armature 17 and a contact element 20 adapted for engagement by the armature to establish direct connection from battery 15 to armature 17 by means of conductor 18 and branch conductor 19. There will be also seen conductor 14′ forming an extension of conductor 14, and contact units 28 and 29 which include a pair of spaced fixed contact elements 31 and 32, respectively, and a mobile double contact element 33. Conductor 38 connects contact element 31 of contact unit 28 with mobile double contact element 33 of contact unit 29.

The lower fixed contact members 32 are connected to one end of electromagnetic coils 74. The other coil ends are connected by leads 75 and conductor 14′ to battery 15. Mobile contact members 33 are biased in upward direction so that their upper contact points normally engage the contact points of the upper fixed contact members 31. The free ends of mobile contact members 33 terminate in hooks 35 adapted for engagement by item retaining elements 36, by means of which merchandise items 37 are suspended. The weight of the items is adapted to cause mobile contact members 33 to move downwardly and to cause their lower contact points to engage the contacts of the lower fixed contact members 32.

When now a pay element enters receiver 10 and causes conductors 13 and 14 to be connected together, current is passed through electromagnetic coils 74, which draw inwardly their respective armatures 76. The latter terminate in semi-loops 77 with sharp interior edges which are adapted to engage and to sever one leg of retaining elements 36, thereby releasing items 37 for delivery. Obviously such item release takes place successively, one by one, following the successive presentation of pay elements into receiver 10.

Thus, the first pay element inserted into receiver 10 will first energize coil 74 of unit 28, provided, of course, that a merchandise item is suspended from hook 35. The corresponding loop cutter 77 now moves into coil 74 and severs one leg of retaining element 36, thereby causing item 37 to drop for delivery, which action releases hook 35 to swing upwards; mobile contact member 33 then assumes its normal upward position, shown in FIGURE 7. At that position mobile contact member 33 (unit 28) is in disengaging position relative to lower fixed contact member 32, thus stopping the flow of current to the electromagnetic coil 74. At its normal upper position mobile member 33 engages upper fixed contact member 31, thereby effecting connection to mobile contact member 33 of unit 29. At the insertion of another pay element into the receiver, electromagnetic coil 74 of unit 29 is energized, provided an item is suspended from hook 35 and causes mobile contact member 33 of unit 29 to engage fixed contact member 32. Now cutter hook 77 of unit 29 severs one leg of retaining element 36, thus releasing the second item for delivery from unit 29.

In the description of FIGURES 1, 2, 2A, and 4 to 6 the merchandise retention elements are shown at close proximity to, or engaging the heating elements; however, these heating elements are not required to become red hot to sever or otherwise weaken the item retention elements, such as rubber bands, nylon cords etc., since even a very low heat is sufficient to cause the retention element to release a merchandise item, thus cutting off current to the heating element before the latter becomes dangerously hot, thereby preventing the formation of smoke or the danger of fire.

This will be readily understood by referring to FIGURES 1 to 2A, wherein the holding relay 16 will become deenergized, thus releasing armature 17, before mobile contact 33 of the contact units 28, 29 and 30 touches upper fixed contact 31.

Figure 12:
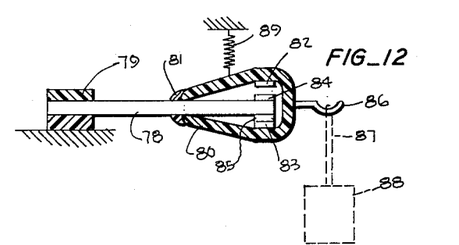
FIG. 12 shows a cross section through a modified suspension arrangement for merchandise items and disclosing a fixed double contact member and two mobile single contacts disposed within a hollow enclosure surrounding the fixed double contact member.

Referring to FIGURE 12, there is diagrammatically illustrated a modified contact unit wherein the double contact member 78 is stationary and is fixedly supported in a dielectric mounting 79. The previously described two fixed outer contact members (31 and 32, FIG. 1) are substituted by a dielectric mobile hollow structure 80 swingably mounted at 81 and enclosing fixed double contact member 78. At the interior of structure 80 are provided upper and lower contact points 82 and 83, respectively, adapted to engage either of the double contact points 84 and 85 of stationary contact member 78. From hollow mobile structure 80 extends a hook 86 for engagement by a retaining element 87 for a merchandise item 88, both being shown in broken lines. A tension spring 89, or any other suitable means, urges structure 80 to normally assume an upward position, whereby contact points 82 and 84 remain separated, while contact points 83 and 85 are in engagement. No until the weight of an item swings structure 80 downwardly, against the force of spring 89, will a separation of contact points 83 and 85 take place and upper contact points 82 and 84 will engage one another. In FIGURE 12 the wiring diagram is omitted as superfluous in view of the explanation of the wiring in conjunction with the previously described illustrations.

While in the embodiments shown in FIGURES 1, 2, 2A, 4 to 7 and in FIGURE 12 merchandise items are suspended from hooks prior to their delivery, a different mode of retaining such items prior to their discharge is proposed by the illustrations seen in FIGURES 8 and 9, wherein the merchandise is supported by a lever structure and is discharged by gravity. The latter figures also show heat-sensitive retaining elements arranged to be capable of effecting release of merchandise for delivery by mere deformation without separating, the one under tension and the other under compression. The embodiments of FIGS. 8 and 9 are, of course, adapted for use with the aforedescribed holding relay and pass-along circuits although these circuits are omitted from these figures for simplicity.

Referring now specifically to FIGURE 8, there is seen a two-armed lever 90 with unequal arms, movably supported at 91. The shorter lever arm 92 is adapted to support an item of merchandise 93 and is normally held in elevated position, for instance, partly by spring 94. The longer lever arm 95 terminates in a hook 96 engaged by a heat-sensitive restraining element 97, which is adapted to either stretch or break when subjected to heat emanating from resistance 98. From the latter leads a conductor 99 into receiver 10, while another conductor 100, also extending into the receiver, but being spaced from conductor 99, connects with one terminal of battery 15.

From the other battery terminal extends lead 101 to a fixed contact 102, normally engaged by mobile contact point 103 mounted at 104 and depending from longer lever leg 95. As long as restraining element 97 remains intact mobile contact 103 engages fixed contact 102. However, deformation or separation of element 97 incident to delivery of merchandise disengages contacts 102 and 103 from each other to break the circuit to heater 98 as will be apparent from the immediately following description. The moment a pay element is inserted into receiver 10 and effects connection between conductors 99 and 100, resistance 98 becomes heated. The heating of the element 98 causes either a stretching or the breaking of restraining element 97, thus causing the weight of item 93 to tilt shorter lever arm 92 downwardly. Consequently item 93 slides off to chute 105 and is discharged from the machine.

A somewhat similar arrangement is illustrated in FIGURE 9. There again is employed a double arm lever 106 with arms of unequal length. Lever 106 is pivotally supported at 107. Short arm 108 supports an item 109 and is normally urged in upward direction by spring 110, while longer arm 111 is engaged and held against movement by a heat-sensitive element 112.

A heating coil 113 is wound about element 112 from which coil extends conductor 114 directed into receiver 10. Another conductor 115, spaced from conductor 114, extends from the receiver to one terminal of battery 15, while from the other battery terminal a lead 116 is connected with heating coil 113. Upon insertion of a pay element into slot 11 of receiver 10 heating coil 113 is energized, its heat causing the deformation of element 112, thereby permitting the tilting of lever 106 in response to the weight of item 109. The latter then slides off short lever arm 108 upon chute 117, from which it is delivered.

Figure 10:
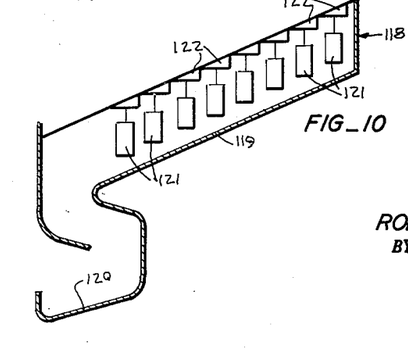
FIG. 10 illustrates a compartment for holding merchandise items restrained in position for delivery into a single discharge chute.

As explained in connection with FIGURE 1, there is employed a plurality of series-connected switch units, and, while only three such units are seen in that figure, it is contemplated to provide any number of such units in one machine. A diagrammatical illustration of a vending machine portion, representing a compartment for holding eight merchandise items to be successively dispensed is shown in FIGURE 10. Compartment 118 is shaped to form a chute 119 terminating in a receptacle 120 for dispensed items. All of the merchanise items indicated at 121 are suspended from their respective contact units 122, all the wiring and the detail arrangements being omitted.

Figure 11:
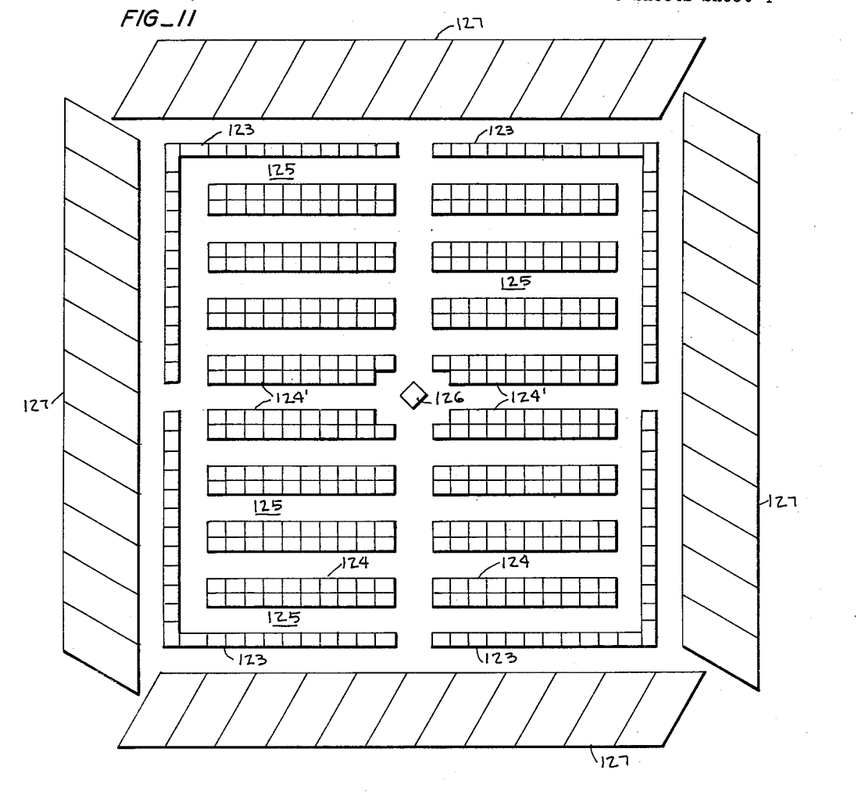
FIG. 11 is a diagram of a store area equipped with banks or rows of vending machines.

At the start of this writing it was stated that it is contemplated to equip a store with a plurality of banks of vending machines designed to facilitate direct delivery of merchanise items to the customers, whereby the usual delay of paying for merchandise at the checking-out counter is eliminated. The illustration in FIGURE 11 is a typical representation of such contemplated store arrangement.

There are seen vending machine rows 123 forming corner enclosures for an area within which is located a plurality of double rows of banks 124 of vending machines. Each of the machines is indicated by either a square or a rectangle. Between the different rows of banks of vending machines are provided passageways 125 for facilitating the use of carts by purchasers. In observing the four double rows 124' disposed at the middle of the floor, it will be noted that the innermost vending machine units are omitted to provide space about an exchange booth 126, where pay elements can be purchased for the various merchandise items to be dispensed from the vending machines.

At the extreme periphery of the floor supporting the banks of vending machines are provided marked spaces 127 for accommodating carts not in use.

Referring to the embodiment shown in FIGURES 13, 14 and 15, there is indicated a somewhat different approach to the operation of vending machine elements seen and described in connection with FIGURES 1 to 9 and FIGURE 12.

This embodiment uses the principle of "first in and first out," as referred to the merchandise items to be dispensed, and therefore is different from the principle used in the previously described figures, although the arrangement of machine units seen in FIGURE 11 is applicable.

In FIGURES 1 to 10 and 12, as well as in many prior art dispensers the items to be dispensed are loaded from a point adjacent to the point of discharge so that when some of the originally stocked items are left in the machine, fresh items are placed ahead of them. Thus the unsold items of the original filling become stale.

Figures 13, 14, 15:
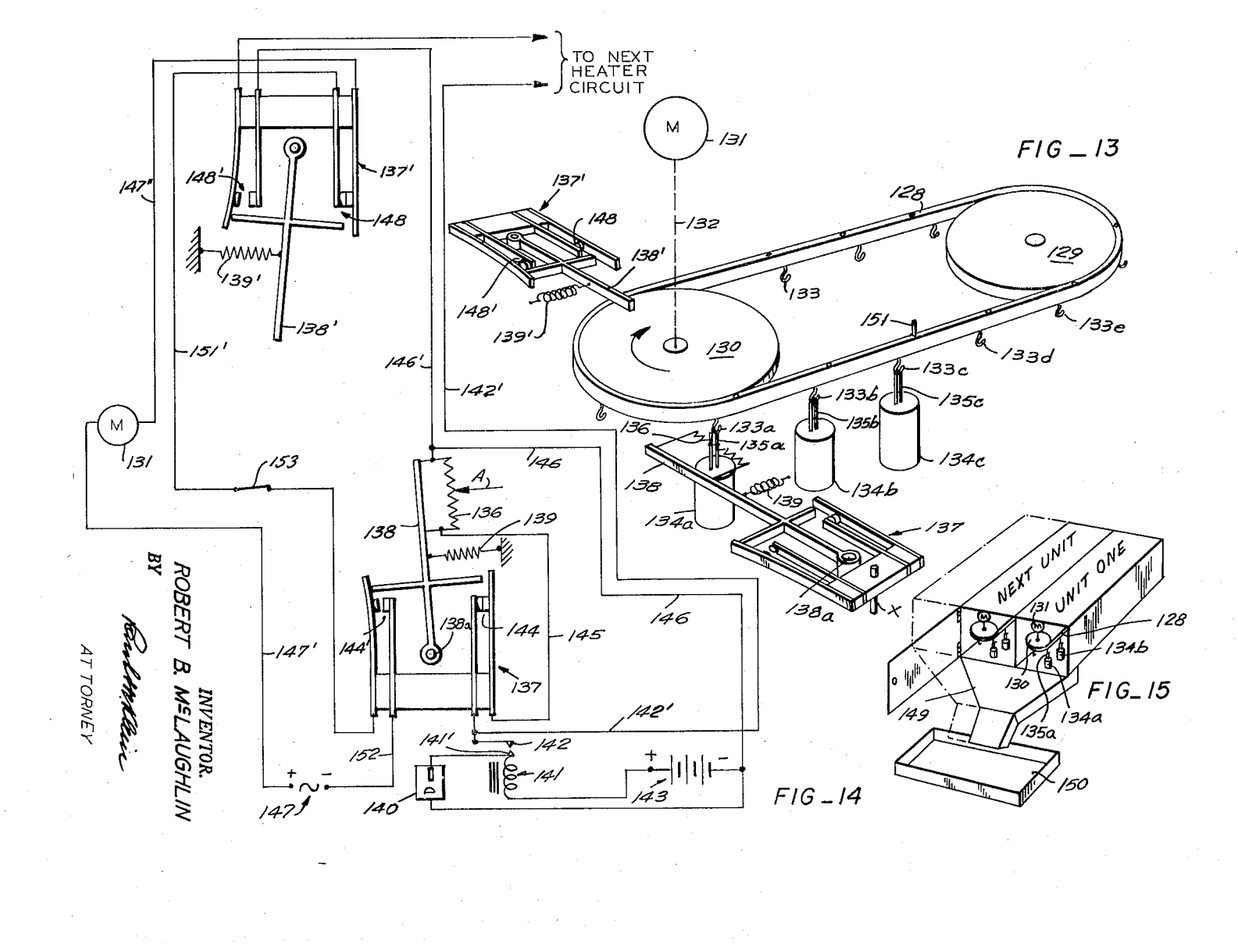
FIG. 13 is a diagrammatical perspective representation of a dispenser mechanism and parts of the circuitry, but without a housing, the latter being omitted for clarity.
FIG. 14 is a schematic circuit diagram for the embodiment of FIG. 13.
FIG. 15 is a schematic perspective illustration, showing a pair of dispensing units as a part of a vending machine cabinet, which latter is intended for accommodating a multiplicity of such units.

The operating principle embodied in the diagrammatical illustrations seen in FIGURES 13 to 15, inclusive, differs from the modus operandi described previously. In FIGURE 13 will be seen an endless conveyor loop 128, which may be a belt or a chain (illustrated as a belt) passing over pulleys 129, 130 (or sprockets, as appropriate). One of the pulleys or sprockets 130 is driven by a motor M, indicated at 131, by way of a shaft 132, shown schematically.

Conveyor 128 carries a plurality of suspension means, such as hooks 133 from which are hung items of merchandise 134 by means of heat-severable item-suspending elements 135, similar to those seen in the previously described figures. Only one Nichrome wire heater element unit 136 is required in this modified form, instead of one for each item as in the previously described embodiments.

This heater unit 136 is fixedly attached to and forms a part of an operating arm of a "make-before-break" switch arrangement or switch unit indicated at 137. Switch arm 138 is preferably pivoted at 138a and is adapted to be actuated by item-suspension elements 135. Arm 138, when not displaced by element 135, is returned to and is held in its normal position by spring 139, shown schematically.

Assuming the machine is stocked and ready to vend, an item-suspending element, such as 135a, is bearing against heater 136 as shown in FIG. 13 and indicated by arrow "A" in FIG. 14. This holds arm 138 in the position shown in FIGS. 13 and 14, displaced about its pivot 138a from its normal position against the tension of restoring spring 139. Insertion of a pay element in receiver 140, FIG. 14, causes relay 141 to be energized and attracts armature 142. Thus current is caused to pass from the positive end of electric source 143, shown as a battery, through relay 141, armature 142, closed switch 144 which is allowed to be closed by virtue of the aforementioned displacement of arm 138, thence through conductor 145, through heating element 136, and finally through conductor 146 to the negative end of the battery 143.

In the aforementioned displaced position of arm 138, shown in FIGS. 13 and 14, the contact pair 144' is open, having been opened by and being retained in open position by the cross bar of arm 138. Since switch arrangement 137 is a make-before-break device, contact pair 144 would have closed before contact pair 144' opened.

The heater circuit shown in FIG. 14 for the dispensing unit shown in FIG. 13 operates generally as in the previously described figures, the usual receiver 140, holding relay 141, and electric current source such as battery 143 being similar to their counterparts in the other figures.

As a part of the switch arrangement 137, contact pair pair 144' forms part of a circuit controlling the motor M designated as 131. That circuit includes a source of energy, shown as a conventional A.C. power supply 147 (FIG. 14), motor 131 and a make-before-break switch 137' similar to 137. Switch 137' has a pair of contacts 148, shown closed, and in series with motor 131. Switch 137' also has a pair of contacts 148', shown as open, in series with the "next heater circuit," as indicated in FIG. 14, which heater circuit is identical with that of heater 136.

The heater circuit of any additional dispensing unit is identical with the dispensing unit shown in FIGURE 13. More than two such units can be located in a single general housing similar to the arrangement seen in FIGURE 15, although the units may be arranged adjacent to each other, or above or below each other and can be provided with single discharge chute arrangements 149 discharging items of merchandise into a common receiver 150.

The arrangement of units is preferably such, that when one of the units is empty, the next unit can be operated, and after that is empty the following units take over.

Referring again to FIGURE 13, there will be seen mobile detent, peg or pin 151 extending from conveyer 128. That peg 151 while movable to various positions along conveyer 128, preferably is located to the rear of or directly behind the last loaded item, shown at 134C. Detent or peg 151 is adapted to actuate switch arm 138' of switch unit 137' seen at the left upper part of FIGURE 13. Arm 138' is restored to its normal position by spring 139', each time after detent 151 has been removed from engagement with arm 138'.

*Operation of the Embodiment Shown in Figures 13, 14 and 15*

A pay element placed in receiver 140 causes closing of the circuit through relay 141 for an instant sufficient to attract armature 142 and complete a holding circuit which keeps relay 141 energized until element 135a, touching heater 136, separates. That circuit, starting at the plus (+) terminal of battery 143, is as follows: + 143, holding relay 141, contact 141', armature 142, closed contacts 144, conductor 145, heater wire 136, line 146 to the minus (−) terminal of battery 143.

As suspension element 135a separates, item 134a is released and falls through a chute (149, FIGURE 15) to receiving tray 150. As element 135a separates, its pressure on lever arm 138 is removed and spring 139 swings arm 138 to the right (see FIGURE 14). Since switch arrangement 137 is a make-before-break switch, contact pair 144' closes first and then contact pair 144 opens. The opening of switch pair 144 releases armature 142, so that the presentation of another pay element is needed to start another operating cycle.

The closing of switch pair 144' energizes motor 131

(see FIGURE 14) to turn pulley 130 (FIGURE 13) in the direction of its arrow. The motor circuit is as follows: From + terminal of electric source 147, line 147' leads to motor 131. Line 147" passes to closed contact pair 148 of switch 137'. Lead 151' passes from closed contact pair 148 to *now closed* contact pair 144' of contact arrangement 137, and conductor 152 connects closed contact pair 144' with the negative terminal of source 147.

Motor 131 turns pulley 130 until suspending element 135b (see FIGURE 13) of item 134b bears against heater 136.

Since heater 136 is not energized because armature 142 had been released, suspension element 135b is not severed and will not be severed until a new pay element is placed in receiver 140. Thus element 135b (FIGURE 13) continues to move against heater wire 136 until arm 138 allows contact pair 144 to close and opens contact pair 144'. (FIGURE 14.) The opening of contact pair 144' opens the circuit to the motor 131, and all motion stops. With contact pair 144 closed and contact pair 144' open, while suspension element 135b leans against heater wire 136, the device is ready for the next operating cycle. A new pay element placed into receiver 140 will cause the dispensing of item 134b. Thus the sale cycle is repeated.

When the last item 134c has been sold, there is no "next" element 134d to open the motor circuit by opening contact pair 144'. Hence the motor continues to run until peg 151 pushes against arm 138' of switch arrangement 137' sufficiently to actuate the latter by first allowing contact pair 148' (FIGURE 13) to close and then causing the opening of contact pair 148.

The opening of contact pair 148 in the switch arrangement 137' (FIGURES 13 and 14) keeps motor 131 permanently deenergized until the attendant removes peg 151 incidental to re-loading the empty unit, say unit one (FIGURE 15). Thus unit one (1) will not keep running, while there are no items to be dispensed.

The closing of contact pair 148' in switch arrangement 137' readies the heater circuit of the next unit to unit one (1) so that the insertion of a pay element in receiver 140 causes the dispensing of items from the next unit as unit one (1) becomes empty.

The circuit is as follows: From plus 143, through coil of relay 141, contact 141', armature 142 as it touches contact 141' (since the presentation of a pay element momentarily energizes relay 141, which attracts the armature), conductor 142' leading to the Nichrome heater of the "next" unit (see (FIGURE 14), closed contact pair 148', conductor 146', line 146 to the negative (—) end of source 143. Notice that heated element 136 is *not* energized, while the heater in the "next" unit is being used. That is so because contact pair 144 is held permanently open by arm 138 as the latter is pulled by spring 139, until unit one (1) is re-loaded and one of the heat-sensitive suspension items 133 bears against heater 136.

The virtue of this embodiment is that the dispensing units can be loaded from one end and can extend to a substantial depth without the need for an extensive area to provide access for the loading or re-stocking of the units. In other words, the units require no loading access at their rear end.

In order to re-stock a unit, the attendant merely unlocks and opens the loading door, which may serve for more than one unit. Assuming that some items remain unsold, as for example, the three remaining in FIG. 13, the following procedure would be undertaken, described for illustration with reference to FIGS. 13 and 14. The attendant, after opening the door, first moves switch assembly 137 out of the way. The assembly, including spring 139, is preferably mounted for this purpose on a hinge or the like indicated at X, and is provided with a latch, or the like, not shown, to hold it in operating position. As the switch assembly 137 is swung (to the left), heater wire 136 will not be engaged by any of the severable suspension elements 135a, 135b or 135c and the arm 138, acting under the force of spring 139, will move to allow contact pair 144' to close and to open contact pair 144. The opening of contact pair 144 prevents undesired accidental energizing of heater element 136 during loading.

Closing of contact pair 144' energizes motor 131, thus casuing the conveyor to start moving toward its re-loading position. While it is so moving, the attendant is free to perform the same initial steps on other machines and prepare fresh merchandise for loading. The motor continues to drive the conveyor until the detent 151 engages arm 138' and shuts off the motor 131 by opening switch 148. The attendant now returns to the machine for re-loading. He first swings the switch assembly 137 back into operative position to engage the suspension elements. He next removes peg 151, which starts motor 131 driving the conveyor, and he then proceeds to load fresh merchandise items on the empty hooks as they pass by him. By the time the last usable empty hook has been loaded, item 134a will have made a complete trip around the pulleys and will assume its position shown in FIGURE 13 so that it will be the first item sold. As it assumes this position, its suspension element 135a thereupon bears against heater element 136 thus moving arm 138 into position where it opens contact pair 144', thus, in turn, stopping motor 131. Then the attendant places the peg 151 behind the last item he loaded, the peg being located, of course, to the right of arm 138' as viewed in FIGS. 13 and 14 so that the peg will thereafter actuate arm 138' only after all the loaded items have been sold. The machine is now ready for the next sales cycle.

If desired, any convenient manually operated control, such as normally-closed foot switch 153, can be used to stop the operation of the motor 131 during the loading procedure.

If the unit is completely empty when the reloading starts, the procedure is generally similar to that immediately aforedescribed. In this case the pin 151, having been behind the last item vended, will have been abutted against arm 138' and thus stopped the motor 131. The switch assembly 137 need not in this instance be swung out of the way on hinge X since there are no unvended items left to engage it. It suffices to remove pin 151, which starts the motor 131, and then to load each hook as it passes by. When the conveyor stops moving as the first-loaded item engages heater 136, the pin 151 is re-inserted to the right of arm 138' just behind the last item loaded and the machine is then ready for the next sale cycle.

The advantages of this embodiment are, first, if the attendant skips loading a hook by mistake, no harm is done since the motor just keeps operating the conveyor until the next loaded hook, wherever it may be, brings one of the severable suspension elements 135 against heater wire 136 to shut off the motor. Second: For bulky items which would require a space greater than that provided by the distance between two adjacent hooks, items can be loaded on every second hook instead of upon every single hook. Such "second hook suspension" does not cause any difficulty in the operation of the units. Thus a greater flexibility and applicability of dispensing with the same machine a great variety of items of different sizes and shapes is rendered possible.

As indicated in FIGURE 11, there may be arranged any number of machines within a relatively small floor space area. Likewise, each one of the cabinets indicated can contain more than one dispensing unit, and any set of units in a cabinet can be arranged to operate in sequence, that is when one unit is empty, the other unit will take over delivering merchanise.

Third: As compared with the previously described embodiments, the one seen in FIGURES 13, 14 and 15 requires only a few simple sets of switch contacts, which are easy to maintain in working order, whereas the devices seen in FIGURES 1 to 9 and 12 employ separate switches for each item of merchandise.

It is to be noted that the switch arrangements 137 and 137' in FIGURES 13 and 14 are preferably of the snap action type, which are readily available, so as to avoid possible chattering at making and breaking of contacts.

From the foregoing description of the several drawings held in a more or less diagrammatical fashion, the broad intent of the present disclosure will become readily apparent. Obviously in translating the various showings into practical, commercially acceptable mechanisms, numerous structural developments will have to be considered, which necessarily will entail changes and improvements to effect rational and economic production, all of such changes and improvements being deemed to reside within the broad scope of the present invention, as defined in the annexed claims.

What is claimed as new is:

1. In a vending machine for dispensing merchandise items, a receiver for pay elements, pay elements adapted for placement into the receiver, a normally open electric circuit having spaced conductors disposed within the receiver and adapted to become momentarily connected by insertion of a pay element into the receiver, thereby closing the electric circuit, heat-severable retaining elements for each of said items, and means in and controlled by said electric circuit for causing the energizing of a heating element adjacent to said retaining elements so as to sever the latter, thereby causing said severed retaining elements to relinquish items for delivery upon insertion of a pay element into the receiver.

2. In a vending machine for a plurality of merchandise items, in combination, an endless conveyor, an energy source, a motor supplied by the latter and serving for actuating said conveyer, a plurality of spaced means for attaching merchandise items carried by said conveyor, individual heat-severable item suspension elements removably associated with said attaching means, a plurality of merchandise items secured by means of said suspension elements to said attaching means, a "make-before-break" switch unit in cooperation with the conveyor, the switch unit being hinged for manual movement and having a spring-biased, pivoted switch arm, a heater unit supported by said switch arm and normally extending into the path of heat-severable item suspension elements, said elements being adapted to engage, one by one, said heater unit and, before being severed by the latter, to move the switch arm, the said movement of the switch arm causing a "make-before-break" effect in said switch unit to ready said heater unit for energizing and to open the circuit to said motor; another switch unit controlling the energy supply to said motor being located adjacent to said conveyor and having a spring-biased switch arm for effecting, when operated, the movement of that other switch unit, a mobile detent, placeable at different locations along said conveyor and being adapted to engage and to operate the switch arm of said other switch unit for cutting off current to the motor, thereby stopping the operation of the conveyor.

3. In a dispensing unit for merchandise items in a vending machine, an endless conveyor, an electric circuit including a source of electric energy, a motor connectable with that source for driving said conveyor, a plurality of spaced means carried by the conveyor for suspending merchandising items, heat-responsive suspension elements adapted to be removably secured to said suspending means and in turn serving for suspending individual merchandise items, at least one "make-before-break" switch unit having a spring biased operating arm, said arm being disposed in the path of said heat-responsive suspension means, another switch unit disposed for cooperation with said conveyor, a mobile support provided for said one switch unit, its operating arm being pivotally lodged within said one switch unit, a heating element secured to said operating arm of said one switch unit and being normally disposed in the path of the heat-responsive suspension means, as the suspended items are being moved towards it by said conveyor, said other switch unit controlling the supply of electric energy to the motor; said electric circuit including both of the switch units, said source of electric energy, a receiver for pay elements and a holding relay; a mobile detent extending from the conveyor and being adapted to engage the operating arm of the other switch unit when the supply of merchandise items is exhausted, thereby cutting off the supply of current to the motor and stopping the operation of the conveyor, a pay element inserted into said receiver causing the energizing of said holding relay, the latter closing the circuit portion of the one switch unit, which latter switch unit in turn causes current to pass through the heating element, said heating element being adapted to cause to separate the heat-responsive element of that one item which is suspended from said heat-responsive element and which the conveyor has caused to approach the heating element, thus releasing said item for delivery; the repeated insertion into the receiver of a pay element causing the repetition of the aforestated working cycle and the release for delivery of the next item suspended from the conveyor.

4. In an electrically operated vending machine having a receiver for pay elements and forming a part of an open circuit closeable by the deposit into said receiver of a pay element, a pay element for placement into said receiver, merchandise items in said machine, heat-severable elements adapted for readying such merchandise items for, but normally preventing their delivery, heating means adapted to become energized upon the insertion of a pay element into said receiver, and, when thus energized to break said heat-severable elements to relinquish items readied for delivery.

5. In an electrically operated vending machine as in claim 4, and wherein said heating means are stationary, one serving for breaking but one of the heat-severable elements.

6. In an electrically operated vending machine as in claim 4, and wherein there is employed a single, but mobile heating element for breaking a plurality of heat-severable elements, one by one.

7. In a vending machine for a plurality of merchandise items, a merchandise unit comprising in combination, an endless conveyor, a motor for driving said conveyor, a plurality of spaced means for attaching merchandise items carried by said conveyor, individual heat-severable items suspension elements, removably associated with said attaching means for suspending merchandise items from said attaching means; a heater unit normally extending into the path of said heat-severable suspension elements, said elements being adapted to engage, one by one, said heater unit to be severed thereby when said heater unit is energized; switch means operated when one of said suspension elements is in engagement with said heater element to ready a circuit for energizing said heater element and to stop said motor from moving said conveyor; switch means for controlling a circuit governing operation of said conveyor; and means operable at different locations along said conveyor and adapted to actuate said second-mentioned switch means to stop said conveyor.

8. The machine of claim 7 further including a second merchandise unit essentially similar to said first unit; switch means for readying the circuit to the heater unit of said second unit; and means operable at different locations along the conveyor of said first unit to actuate said last-mentioned switch means to ready the circuit to the heater unit of said second merchandise unit.

9. In a vending machine for merchandise items, a receiver for pay elements, a pay element for releasing merchandise items for delivery, adapted for placing into the receiver, an electric circuit, a pair of spaced conductors, forming parts of said electric circuit, extending into said receiver and maintaining said circuit normally open, a pay element entered into the receiver momentarily causing said spaced conductors to be interconnected and close said circuit, an individual, heat-destructible retaining means for each of the merchandise items for keeping each item in readiness for delivery from the machine in response to insertion of said pay element into the receiver, and means controlled by said electric circuit for causing said retaining means to relinquish an item of merchandise for delivery upon its destruction caused by the insertion into the receiver of said pay element, and wherein said item-retaining means constitutes a heat-destructible element.

10. In a vending machine as per claim 9, and wherein said means for causing said retaining means to relinquish an item for delivery comprises a heating element energized by the closing of the electric circuit as a pay element is inserted into the receiver.

11. In a vending machine as per claim 9, and wherein said item-retaining means constitutes a resilient heat-destructible suspension element normally subjected to stress.

12. In a vending machine according to claim 9, a compartment for merchandise items including said individual item-retaining means and said means for causing said retaining means to relinquish said items, and a chute formation for relinquished items terminating in a receptacle for delivered items.

13. In a vending mechine for items of merchandise, a receiver for pay elements, pay elements for insertion into said receiver and for initiating the delivery of merchandise items, a plurality of merchandise items disposed within the machine, individual heat-severable item retaining means keeping each item in readiness for delivery from the machine, and electric heating means for each of said retaining means energized by the insertion into the receiver of a pay element, and wherein said electric heating means constitute a hook-shaped structure of resistance wire from which and in contact with which wire said retaining means are suspended.

14. In a vending machine according to claim 13 and wherein said hook-shaped structure is mobile.

15. In a vending machine according to claim 13, and wherein said hook-shaped structure is stationary.

References Cited by the Examiner

UNITED STATES PATENTS

| | | | |
|---|---|---|---|
| 772,503 | 10/04 | Dodson | 221—30 |
| 1,575,972 | 3/26 | Cochran | 221—302 X |
| 2,148,317 | 2/39 | Lisk | 222—54 X |
| 2,615,107 | 10/52 | Zito | 200—122 |
| 2,616,776 | 11/52 | Jones | 194—7 X |
| 2,661,504 | 12/53 | Toulmin | 186—1.3 X |
| 3,008,479 | 11/61 | Mancusi. | |

FOREIGN PATENTS

| | | |
|---|---|---|
| 777,810 | 3/35 | France. |
| 851,100 | 10/60 | Great Britain. |
| 1,115,974 | 10/61 | Germany. |

LOUIS J. DEMBO, *Primary Examiner.*

HADD S. LANE, *Examiner.*